(12) United States Patent
Shteynberg et al.

(10) Patent No.: US 7,498,709 B2
(45) Date of Patent: Mar. 3, 2009

(54) METHOD AND APPARATUS FOR WINDING SEGMENTS OF A SEGMENTED WOUND MEMBER OF AN ELECTROMECHANICAL DEVICE

(75) Inventors: Vadim Shteynberg, Eden Prairie, MN (US); Huck A. Willgohs, Chaska, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 191 days.

(21) Appl. No.: 11/193,604

(22) Filed: Jul. 28, 2005

(65) Prior Publication Data

US 2005/0258707 A1 Nov. 24, 2005

Related U.S. Application Data

(62) Division of application No. 09/407,136, filed on Sep. 27, 1999, now Pat. No. 6,941,644.

(51) Int. Cl.
*H02K 15/04* (2006.01)
*H01F 41/06* (2006.01)
*B65H 81/06* (2006.01)

(52) U.S. Cl. .................. 310/184; 310/194; 310/254; 242/445; 242/448; 29/602.1; 29/605

(58) Field of Classification Search .......... 310/254, 310/184, 194; 242/440, 443, 445, 448
See application file for complete search history.

(56) References Cited

U.S. PATENT DOCUMENTS

| | | | |
|---|---|---|---|
| 1,073,059 A | 9/1913 | Varley | |
| 2,666,592 A * | 1/1954 | Bieg | 242/445 |
| 3,141,632 A * | 7/1964 | Spitz | 242/118.6 |
| 3,337,145 A * | 8/1967 | Keck | 242/486.8 |
| 3,635,411 A * | 1/1972 | Petrinjak et al. | 242/448 |
| 3,765,080 A | 10/1973 | Lauer | |
| 4,350,914 A | 9/1982 | Searle | |
| 4,473,811 A | 9/1984 | Schauble | |
| 4,712,035 A * | 12/1987 | Forbes et al. | 310/269 |
| 4,774,428 A * | 9/1988 | Konecny | 310/198 |
| 5,425,165 A | 6/1995 | Shramo et al. | |
| 5,859,486 A * | 1/1999 | Nakahara et al. | 310/254 |
| 6,081,059 A * | 6/2000 | Hsu | 310/179 |
| 6,127,753 A * | 10/2000 | Yamazaki et al. | 310/71 |
| 6,163,952 A * | 12/2000 | Takehara | 29/598 |

(Continued)

FOREIGN PATENT DOCUMENTS

JP 57-42112 3/1982

(Continued)

*Primary Examiner*—Burton Mullins
(74) *Attorney, Agent, or Firm*—Fletcher Yoder; Alexander R. Kuszewski

(57) ABSTRACT

In certain embodiments, an electromechanical device is provided with N sets of stator segments, each segment comprising a respective, separate bobbin, the N sets of segments being wound with a single continuous length of wire for each set such that the segments of each set are electrically in series. The electromechanical device, in certain embodiments, has the N sets of segments combined in a common circumferentially adjacent circular arrangement, wherein the single continuous length of wire of each segment is maintained on the bobbin on which the wire was wound.

21 Claims, 8 Drawing Sheets

U.S. PATENT DOCUMENTS 6,400,059 B1 * 6/2002 Hsu ............................ 310/254
6,555,942 B1 * 4/2003 Hsu ............................ 310/208

FOREIGN PATENT DOCUMENTS

| | | |
|---|---|---|
| JP | 57-193015 | 11/1982 |
| JP | 60-182119 | 9/1985 |
| JP | 62-293957 | 12/1987 |
| JP | 3-138918 | 6/1991 |

* cited by examiner

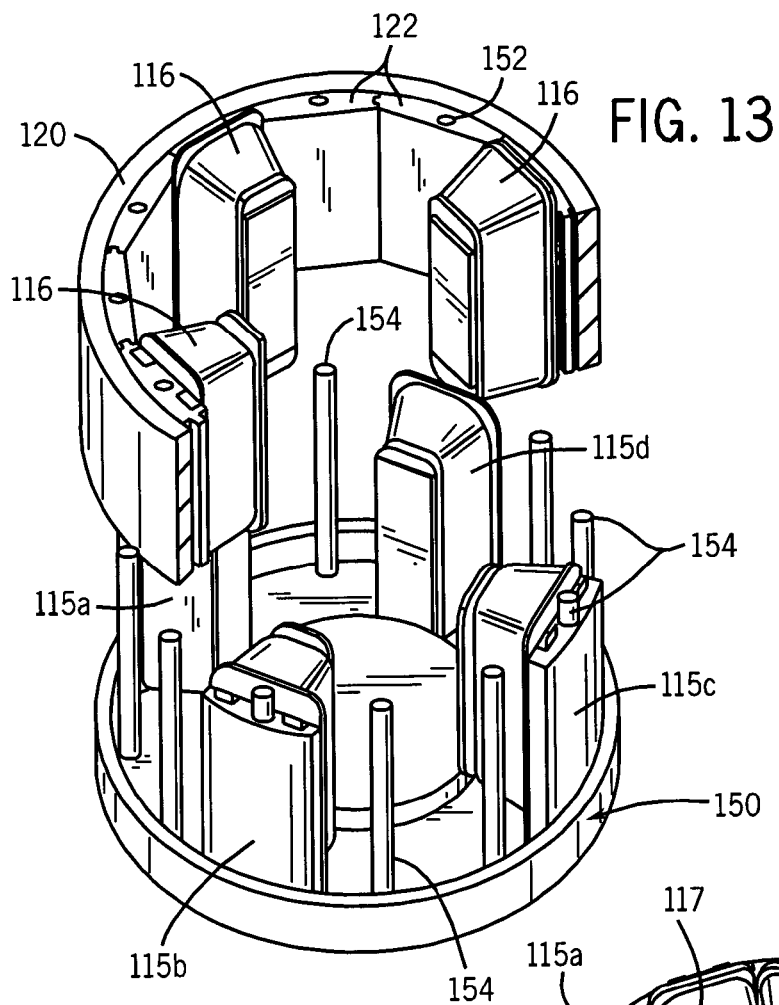
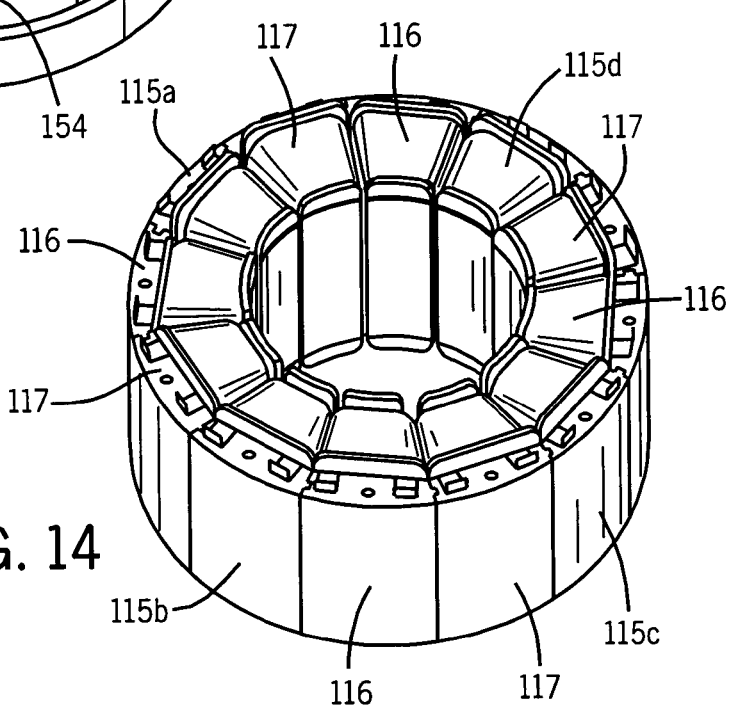

METHOD AND APPARATUS FOR WINDING SEGMENTS OF A SEGMENTED WOUND MEMBER OF AN ELECTROMECHANICAL DEVICE

CROSS REFERENCE TO RELATED APPLICATION

This is a divisional of application Ser. No. 09/407,136 filed on Sep. 27, 1999 now U.S. Pat. No. 6,941,644.

BACKGROUND OF THE INVENTION

1. Field of the Invention

This invention relates to a method and apparatus for winding a segmented stator or rotor of an electromechanical device, such as an electric motor or generator. In a particularly preferred embodiment, the invention relates to a method and apparatus for winding a segmented stator or rotor in which multiple segments for one phase are wound as a set, and then combined with other sets of wound segments for the remaining phases of the motor or generator.

2. Description of Related Art

Electromechanical devices such as motors and generators comprise a stator and a rotor that rotates relative to the stator. In all such devices, either the stator or the rotor (or both) comprises windings that determine basic characteristics of the device.

Focusing for example on a stator of an electric motor, the stator is provided with a number of windings that is determined by the number of phases of the motor. For example, a three phase motor has a stator with three windings. Each of the windings further comprises 2N poles per winding, where N is an integer equal to or greater than one. For example, a three phase four pole motor comprises a total of twelve poles. Each pole further includes one or more coils, with each coil being formed of numerous turns of wire wound around a common bobbin structure.

Various techniques are known for constructing a stator of an electric motor. For example, according to one known technique, the stator is constructed using a large number of very thin laminations that, when stacked together, produce a stator structure that is generally cylindrically shaped with but with bobbin structures that extend the length of the cylinder and that protrude radially inwardly. The bobbins are then each wound with wire to form respective stator coils using a needle-based winding machine that is placed at the center of the stator structure.

A recognized problem with this approach is that the amount of wire that can be provided on each bobbin is limited by the fact a certain amount of space is required for the operation of the winding machine. During the winding operation, the needle travels in the slots that are between the bobbins and, as wire fills the slots, the amount of space left for the needle to travel decreases. The winding operation ends when there is not enough room left in the slots for the needle to travel. At this time, however, the slots are not completely filled with wire, resulting in unutilized space (i.e., incomplete slot fill) once the winding operation is complete. In general, it is desirable to have as many turns of wire as possible in the space provided (i.e., maximum slot fill) in order to maximize the torque and speed characteristics of the motor.

A recognized solution to this problem is to utilize what is referred to in the art as a segmented stator. According to this approach, the stator is constructed using a plurality of segments each of which defines a bobbin upon which wire is wound to form one of the coils of the motor. Each segment is generally T-shaped when viewed from one end of the motor, with the bottom (vertical) leg of the T forming the bobbin upon which wire is wound to form one of the coils of the motor, and the top (horizontal) leg of the T being joined end to end with the top legs of the other T-shaped segments in the shape of a circle, thereby resulting in a circular stator when viewed from one end of the motor. This construction technique therefore results in a stator with an overall shape that is the same as that of an unsegmented stator.

The use of a segmented stator allows for complete slot fill because each segment can be wound individually before being physically combined with the remaining stator segments. As a result, there are no space restrictions to interfere with the operation of the winding machine and to thereby prevent each segment from being completely wound.

However, the fact that the segments are wound individually also requires an increased number of connections that must be made using manual techniques, thereby leading to increased human error in the construction process. Because the segments are wound individually, the various coils must be connected once the stator segments are combined. The coils are not simply all connected in series or parallel but rather are connected according to intricate connection patterns. For example, for a three phase motor, the coils for each phase are connected in series in alternating fashion around the motor, and the windings that are thereby formed are then connected in either a wye or a delta configuration. Even the most careful individuals are prone to making mistakes when trying to connect the various coils in the correct manner. Of course, connecting the coils in an incorrect manner results in a defective motor.

Thus, a system and method of constructing a wound member of an electromechanical device that utilizes a segmented construction technique, but that also avoids the need for the increased number of manual connections that are required by the segmented construction techniques described above, would be highly advantageous.

BRIEF SUMMARY OF THE INVENTION

The present invention overcomes these drawbacks of the prior art. According to a first aspect of the invention, the invention provides a method of constructing a segmented wound member of an N phase electromechanical device, comprising winding N sets of segments and combining the N sets of segments in a common circular arrangement to form the wound member. The N sets of segments are wound with a single continuous length of wire for each set. Each of the N sets of segments is wound separately from the remaining sets of segments and then combined in the common circular arrangement with the remaining sets of segments to form the wound member.

In a first preferred implementation, the winding step includes the following steps. First, a plurality of segments are arranged in a side-by-side orientation along an axis of rotation. The plurality of segments form one of the previously-mentioned N sets of segments. The plurality of segments and a wire dispenser are then rotated relative to each other about the axis of rotation. The plurality of segments are wound during the relative rotation of the plurality of segments and the wire dispenser. The arranging, rotating and winding steps are repeated for each of the remaining sets of segments.

In a second preferred implementation, the winding step includes the following steps. First, a plurality of segments are arranged in a circular arrangement with spaces therebetween. Again, the plurality of segments form one of the previously-mentioned N sets of segments. Then, the plurality of segments are wound, and the arranging and winding steps are repeated for each of the remaining sets of segments.

According to another aspect of the invention, a winding fixture for winding segments of a segmented wound member of an electromechanical device comprises a motor, a rotatable clamp, and a wire dispenser. The rotatable clamp is mechanically coupled to the motor and is capable of being driven by the motor to rotate about an axis of rotation during a winding operation. The rotatable clamp includes first and second end sections that are spaced from each other along the axis of rotation. The first and second end sections are capable of clamping together a plurality of segments in a manner such that the plurality of segments are arranged in a side-by-side orientation along the axis of rotation and such that the plurality of segments rotate about the axis of rotation during the winding operation.

The wire dispenser is movable in a direction parallel to the axis of rotation to various positions adjacent the plurality of segments. The wire dispenser is capable of dispensing wire to each of the plurality of segments by moving from position to position and dispensing wire as the rotatable clamp and the plurality of segments rotate during the winding operation.

Advantageously, the preferred winding fixtures are constructed and arranged so as to permit segments to be wound as a set with a single continuous length of wire. For example, one set may be used for each phase of the electromechanical device. As a result, when the various sets of stator segments are combined, the number of manual interconnections that must be made is minimized. In the context of a three phase motor, for example, all that is required is to connect the three sets of segments in a wye or delta configuration, and it is not necessary to first connect each of the segments within each phase.

Additionally, the preferred winding fixtures achieve this advantage while making maximum use of existing bobbin winding technologies. The bobbin winders utilized by the preferred winding fixtures may be similar for example to bobbin winders that have previously been used for individually winding segments with separate lengths of wire, or to those that have been previously been used for winding unsegmented stators. As a result, the winding fixture 10 can be implemented in straightforward fashion by making maximum use of existing technologies.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 13 is a perspective view of the assembly fixture of FIG. 11 with the stator segments of FIG. 9 mounted thereon, and receiving a second set of segments; and FIG. 14 is a perspective view of a completed stator assembly constructed in accordance with the second preferred embodiment of the present invention.

DETAILED DESCRIPTION OF THE PREFERRED EMBODIMENTS

Figure 1:
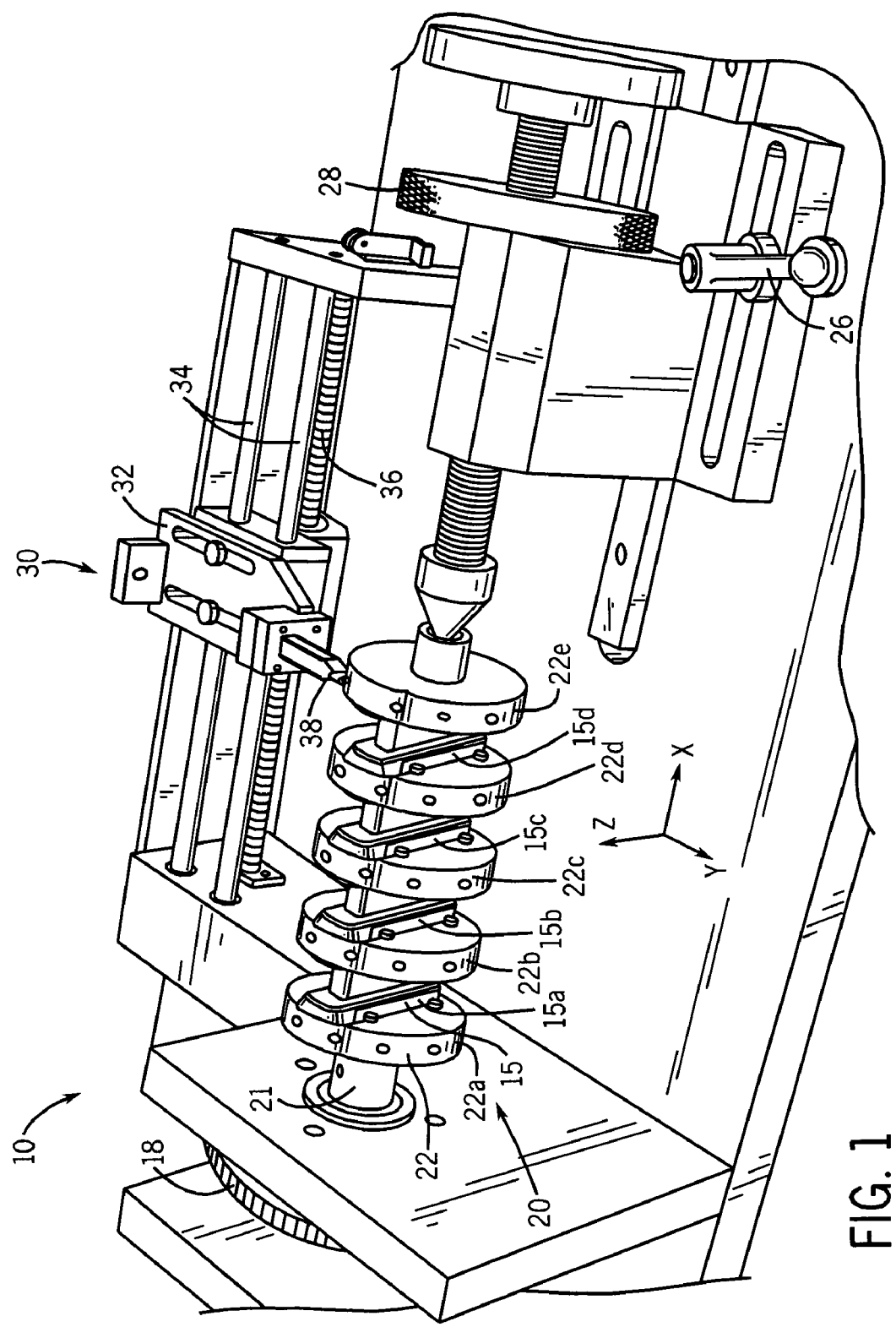
FIG. 1 is a perspective view of a winding fixture according to a first preferred embodiment of the present invention.

Referring now to FIG. 1, FIG. 1 shows a perspective view of a winding fixture 10 according to a first embodiment of the invention. The winding fixture 10 is used to wind a plurality of segments 15 of a segmented wound member of an electromechanical device, such as the stator or rotor of a motor or generator. Herein, it will be assumed that the segments are stator segments for an electric motor, and in particular for a three phase four pole motor.

In FIG. 1, the plurality of segments 15 includes four individual segments 15a, 15b, 15c and 15d. The segments 15 are wound as a set using the winding fixture 10. As described in greater detail below, two additional sets of segments are then also separately wound in the same manner, and the three sets of segments are combined in a common circular arrangement to form the stator for the three phase four pole motor, with each one of the three phases being formed by one of the three sets of wound segments.

The winding fixture 10 comprises a motor 18, a rotatable clamp 20 that is coupled to the motor 18, and a bobbin winder 30. Only a portion of the motor 18 is shown in FIG. 1, which may in practice be part of a gear or pulley system that couples a motor shaft (not shown) of the motor to a rotatable input shaft 21 of the rotatable clamp 20.

The rotatable clamp 20 further comprises first and second outer end sections 22a and 22e that clamp together the segments 15. The first and second outer end sections 22a and 22e form nests that are similar to several additional nests 22b, 22c, and 22d which are disposed in alternating fashion between the segments 15. The segments 15 and the nests 22 are arranged in a side-by-side orientation along an axis of rotation which, in FIG. 1, is shown to be the X-axis and is defined by the axis of rotation of the shaft 21.

Compressive force is applied to the nest 22e by the shaft 26, which has a position along the axis of rotation that is adjustable by a course adjustment mechanism 26 and a tightening assembly 28. The position of the nest 22e along the axis of rotation depends on the number and thickness of the segments to be wound.

The bobbin winder 30 is disposed adjacent the segments 15 and the nests 22. The bobbin winder 30 is conventional and may, for example, be a model ER 500 CNC2 or ER26L CNC winder (available from Bobifil, Poligono Industrial Virgen de la Salud, 46950 Chirivella (Valencia) Spain) however, any suitable bobbin winder may be used. The bobbin winder 30 includes an assembly 32 that is moveable back and forth along two posts 34 that are parallel to the axis of rotation. Movement of the assembly 32 is controlled by a lead screw assembly 36 which is driven by an additional motor (not shown). The assembly 32 also includes a wire dispenser 38 (shown more clearly in FIG. 2) which moves back and forth in the X-direction to various positions adjacent the segments 15 as the assembly 34 moves along the posts 36. The assembly 32 could also be movable in other directions in addition to the X direction, for example, in both the X direction and the Y direction (e.g., in an arc), however, this arrangement is not preferred.

Figure 2:
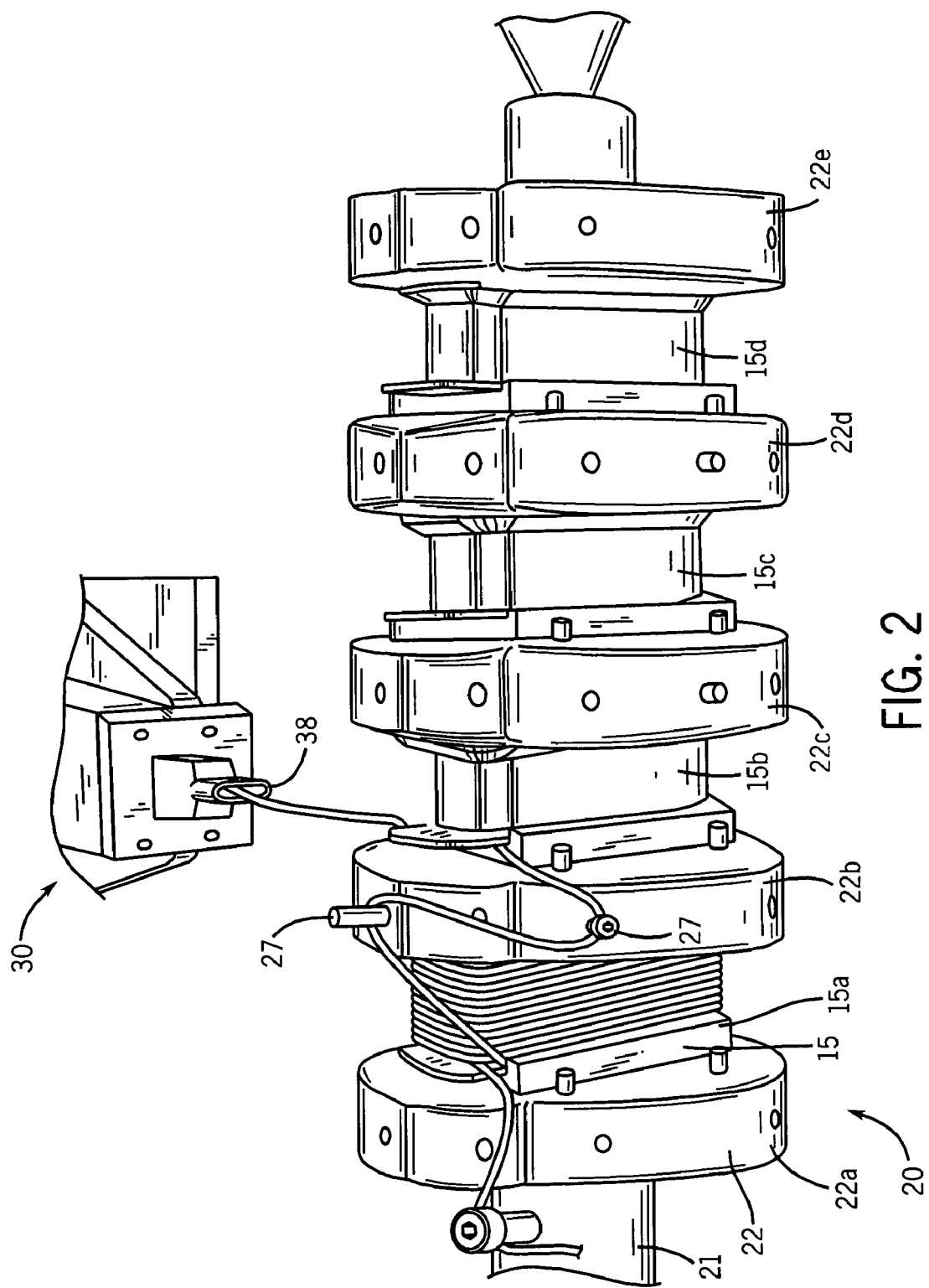
FIG. 2 is a more detailed perspective view showing the operation of the winding fixture of FIG. 1.

Referring now also to FIG. 2, the operation of the winding fixture 10 is described in greater detail. In operation, the segments 15 and the wire dispenser 38 rotate relative to each other while the wire dispenser 38 sequentially dispenses wire onto each one of the segments 15, until all of the segments 15 have been wound. In particular, the rotatable clamp 20 is driven by the motor 18 and rotates about the axis of rotation defined by the shaft 24, thereby causing the segments 15 to rotate about the same axis. Although it would also be possible to have the segments 15 and the wire dispenser 38 rotate relative to each other by having the plurality of segments 15 remain stationary while having the wire dispenser 38 rotate, rotation of the segments 15 is preferred.

As the segments 15 rotate, the wire dispenser 38 moves in a direction parallel to the axis of rotation to various positions that are each adjacent a respective one of the segments 15. At each position, the wire dispenser 38 remains substantially stationary while dispensing wire to the respective one of the segments 15 as the segments 15 rotate. In practice, a small amount of movement at each position may be necessary for proper wire placement. As the wire dispenser 38 moves between segments 15, posts 27 on the nests 22 are preferably used to control the amount of wire that is placed between each separate segment 15. This amount of wire is required to permit the segments 15 to be spaced from each other in the completed stator (see FIGS. 5-6).

This process continues for each of the segments 15, until all of the segments 15 have been wound. It is therefore seen that, because the segments 15 are wound in a single winding operation, it is possible to wind the segments 15 with a single continuous length of wire. Although it would also be possible to use the winding fixture 10 for winding individual segments with separate lengths of wire by starting a new length of wire for each segment 15, this approach is not preferred.

Figure 3:
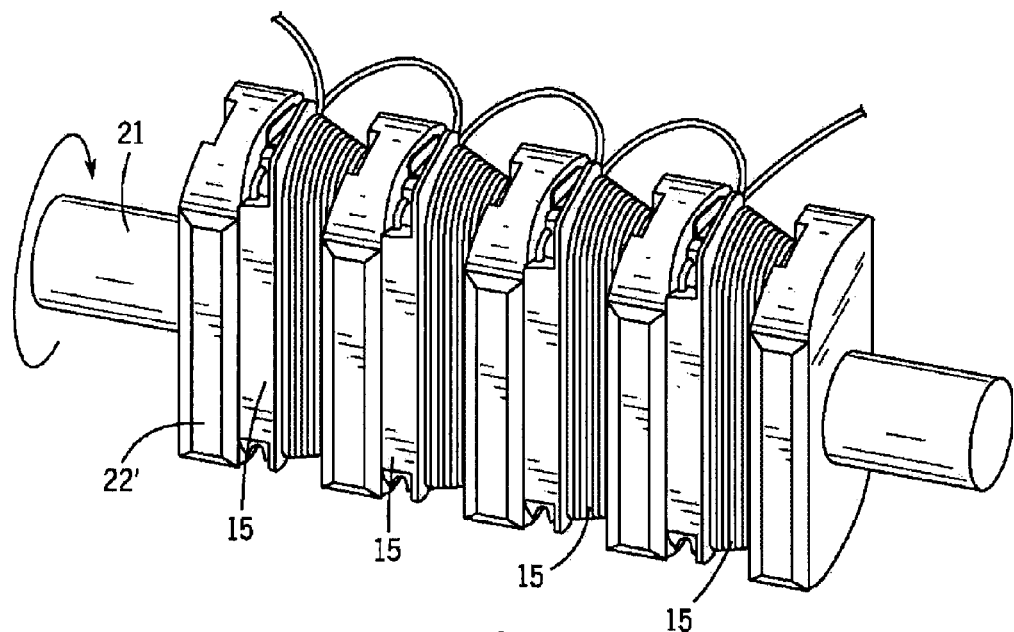
FIG. 3 is a perspective view showing stator segments wound using the winding fixture of FIG. 1.
Figure 4:
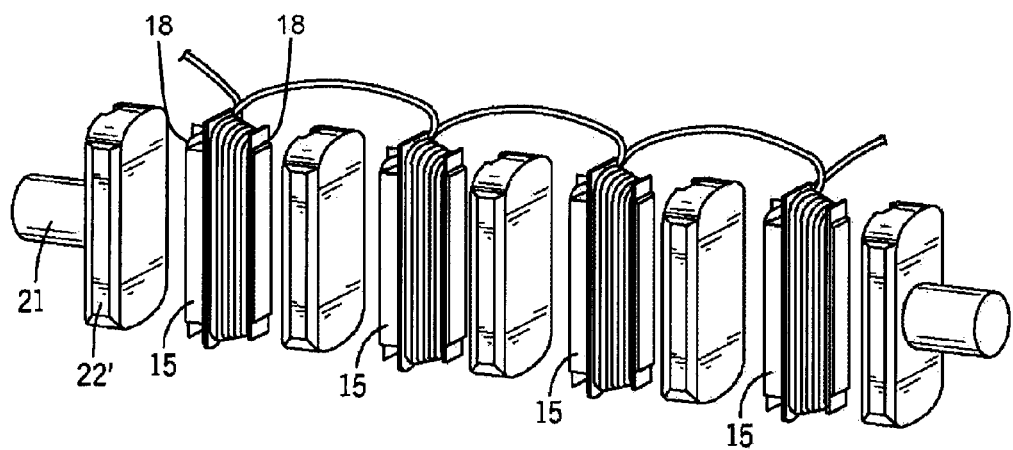
FIG. 4 is an exploded perspective view showing stator segments wound using the winding fixture of FIG. 1.

FIGS. 3 and 4 show the segments 15 after the winding operation shown in FIG. 2 is complete. Additionally, FIG. 3 shows alternative nests 22' in which the posts 27 are not used to control the amount of wire that is disposed between each separate segment 15. In the embodiment of FIG. 3, this control is achieved manually. FIG. 4 is similar to FIG. 3, except that it shows an exploded view of the segments 15 and the nests 22'. As illustrated in FIG. 4, the segments 15 may include mounting ends 18 through which the segments 15 may interface with the nests 22'.

Figure 5:
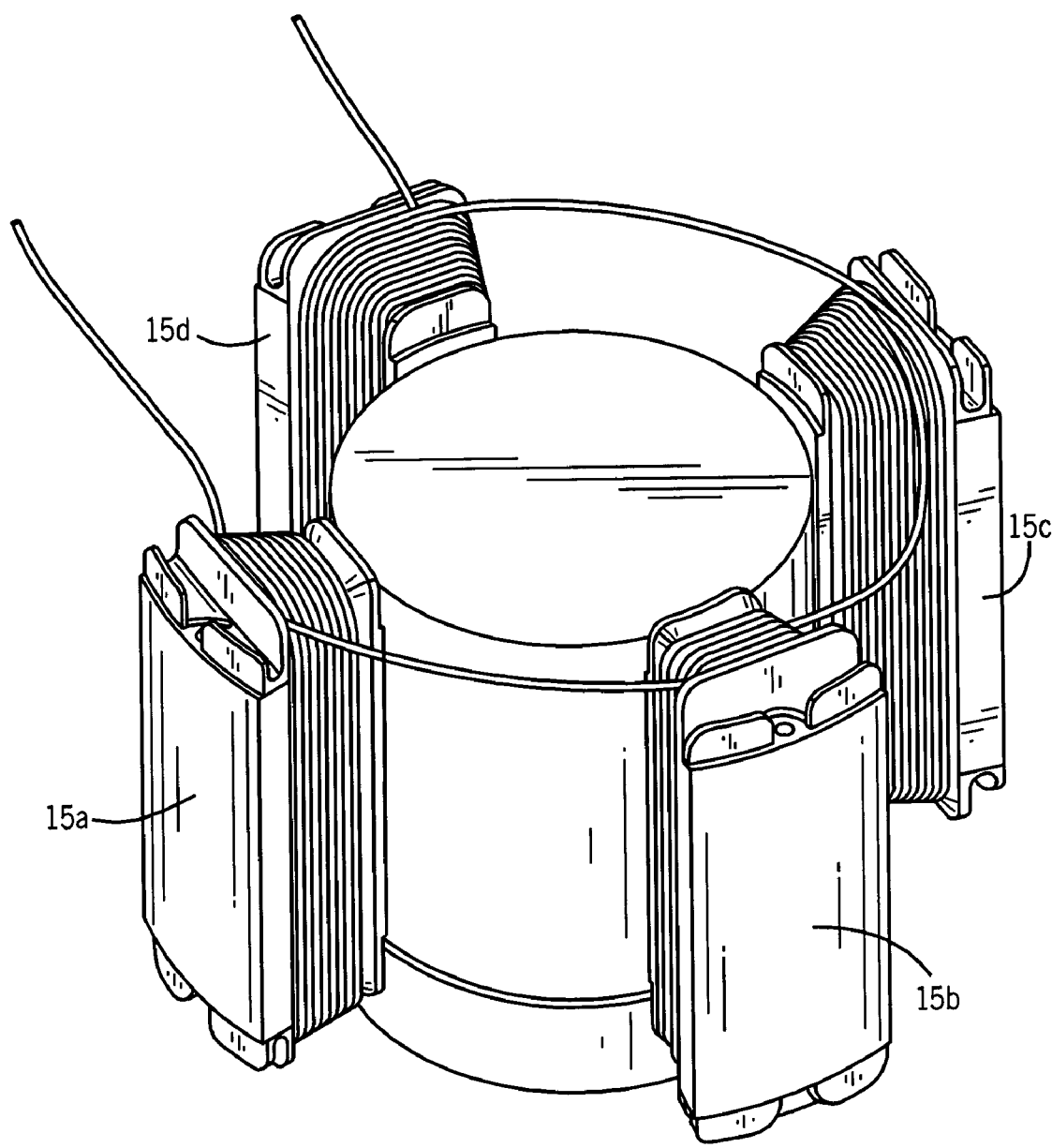
FIG. 5 is a perspective view of the wound stator segments of FIGS. 3-4 arranged in a circular arrangement to form part of a stator.
Figure 6:
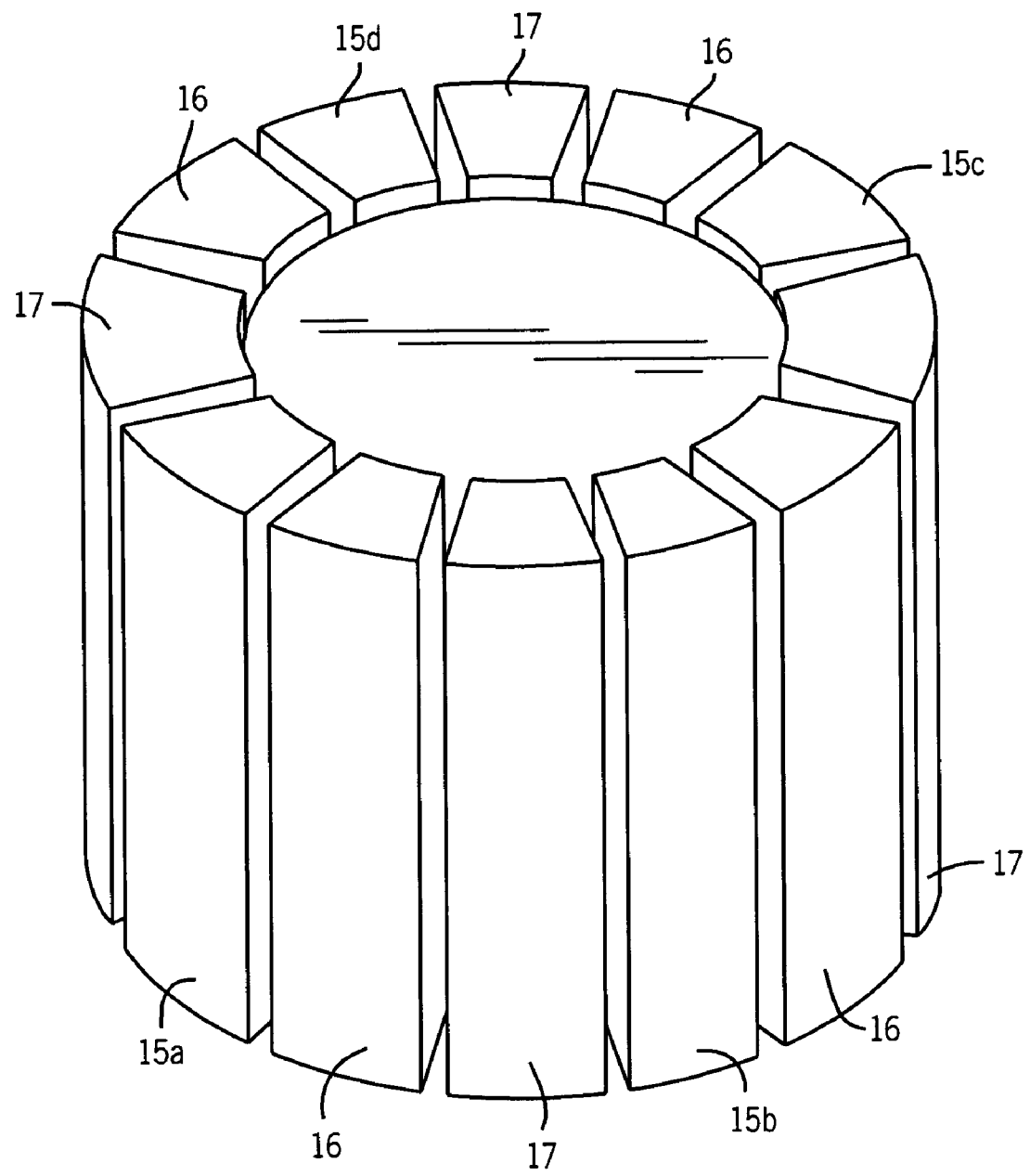
FIG. 6 is a schematic view of a completed stator assembly constructed in accordance with the first preferred embodiment of the invention.

FIG. 5 shows the stator segments 15 placed into a circular arrangement to partially form a stator. For a three phase motor, the process that has been described with respect to FIG. 2 is performed two additional times for a total of three times, one time for each phase of the motor. In general, for an N phase M pole motor, N sets of M segments are utilized, assuming each pole is implemented with a single coil. Of course, it is also possible to implement each pole using multiple coils. In the illustrated embodiment N is equal to 3 and M is equal to 4. FIG. 6 schematically shows the segments 15 combined in a common circular arrangement with two additional sets of segments 16 and 17 to form a completed three phase stator.

Figure 7:
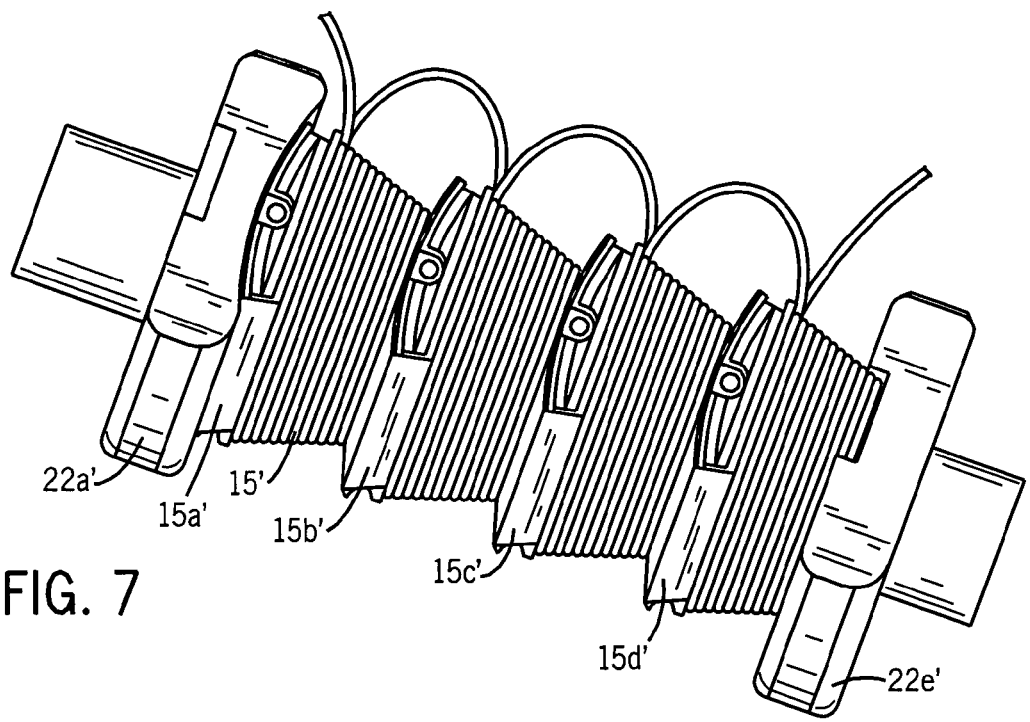
FIG. 7 is a perspective view that corresponds to FIG. 4 but showing an alternative embodiment that uses dimpled segments instead of nests.

FIG. 7 shows an alternative embodiment in which segments 15' are each provided with dimples that are engaged by protrusions on adjacent segments 15'. As well, the inner surface of each segment 15' is adapted to engage the outer surface of the adjacent segment 15'. This arrangement allows the segments to be clamped between end sections 22a' and 22e' without the use of nests.

From the foregoing description, a number of advantages of a winding fixture according to a first embodiment of the invention are apparent. First, the winding fixture 10 is constructed and arranged so as to permit segments to be wound as a set with a single continuous length of wire. For example, one set may be used for each phase of the electromechanical device. As a result, when the various sets of stator segments are combined, the number of manual interconnections that must be made is minimized. In the context of a three phase motor, for example, all that is required is to connect the three sets of segments in a wye or delta configuration, and it is not necessary to first connect each of the segments within each phase.

Additionally, the winding fixture 10 achieves this advantage while making maximum use of existing bobbin winding technologies. The bobbin winder 32 may be similar for example to bobbin winders that have previously been used for individually winding segments with separate lengths of wire. As a result, the winding fixture 10 can be implemented in straightforward fashion by making maximum use of existing technologies.

Figure 8:
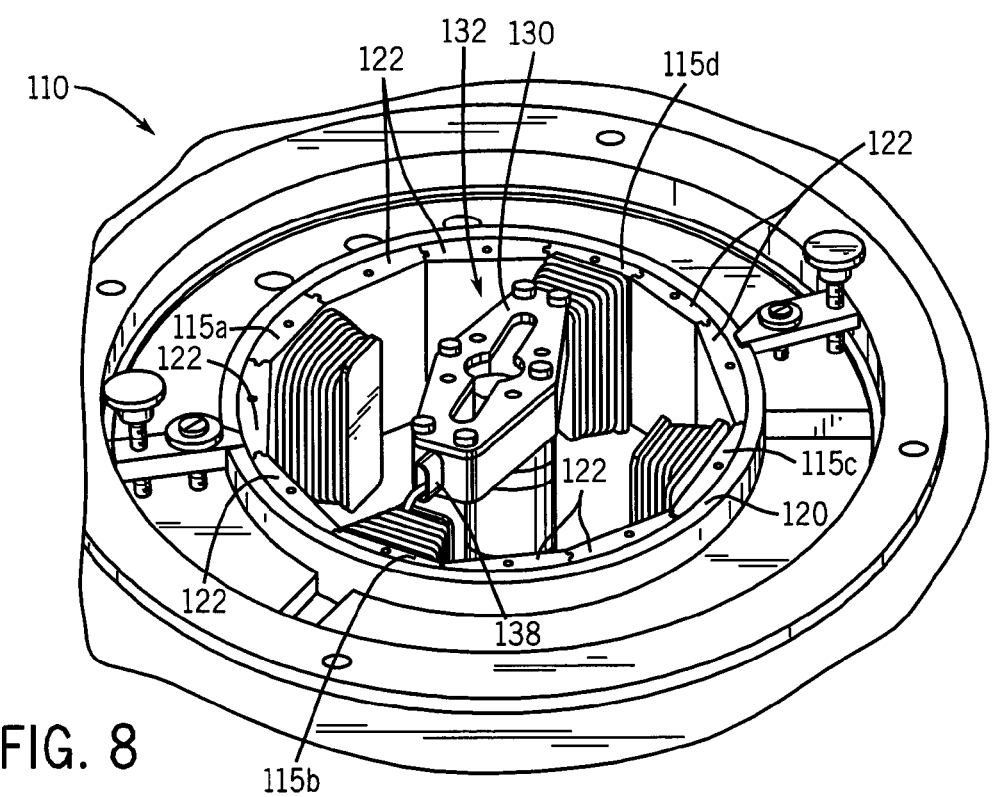
FIG. 8 is a perspective view of a winding fixture according to a second preferred embodiment of the invention.

Referring now to FIG. 8, a perspective view of a winding fixture 110 according to a second embodiment of the invention is illustrated. The winding fixture 110 is used to wind a plurality of segments 115 of a segmented wound member of an electromechanical device. Again, for purposes of explanation, the segments 115 to be stator segments of a three phase four pole electric motor.

Like the segments 15 of FIG. 1, the plurality of segments 115 in FIG. 8 includes four individual segments 115a, 115b, 115c and 115d. The segments 115 are wound as a set using the winding fixture 110. As described in greater detail below, two additional sets of segments are then also separately wound in the same manner, and the three sets of segments are combined in a common circular arrangement to form the stator for the three phase four pole motor, with each one of the three phases being formed by one of the three sets of wound segments.

The winding fixture 110 comprises a ring clamp 120 and a bobbin winder 130. The segments 115 are disposed inside the ring clamp 120 in a circular arrangement with a plurality of spaces between respective ones of the segments 115. The ring clamp 120 clamps the segments 115 in place and to this end includes a plurality of spacers 122 that are disposed in the spaces between the segments 115 and that maintain the spacing between the segments 115.

The ring clamp is sized so as to match the size of the stator that is being constructed. With four poles per phase, the segments are disposed at 90° intervals in the ring clamp 120. Additionally, with a total of twelve segments, each segment occupies a 30° arc in the circle defined by the ring clamp 120, with the spacers 122 occupying the remaining 60° between each segment.

The bobbin winder 130 is disposed so as to be substantially at the center of the segments 115. The bobbin winder 30 is conventional and may, for example, be a model XL6 2 single spindle winder (available from Windamatic Systems, Inc., Box 10071, Fort Wayne, Ind. 46850) however, any suitable bobbin winder may be used. The bobbin winder 130 includes an assembly 132 that rotates about an axis of rotation that passes through the center of the ring clamp 120. The assembly 132 also includes a wire dispenser 138 which moves in a circle to various positions adjacent the segments 115 as the assembly 34 rotates. The segments 115, the ring clamp 120, and the path of motion of the wire dispenser 138 are therefore concentrically arranged about the axis of rotation. The assembly 132 could also have more complex motion capabilities, however, this arrangement is not preferred.

In operation, the segments 115 and the wire dispenser 138 rotate relative to each other while the wire dispenser 138 sequentially dispenses wire onto each one of the segments 115, until all of the segments 115 have been wound. In particular, the wire dispenser 138 rotates within the ring clamp 120 and rotates about the axis of rotation which passes through the center of the ring clamp 120. Although it would also be possible to have the segments 115 and the wire dispenser 138 rotate relative to each other by having the plurality of segments 115 rotate while having the wire dispenser 138 remain stationary, rotation of the wire dispenser 138 is preferred for reasons described below.

As the wire dispenser 138 rotates, it moves to various positions that are each adjacent a respective one of the segments 115. At each position, the wire dispenser 138 remains substantially stationary while dispensing wire to the respective one of the segments 115. In practice, a small amount of movement of the wire dispenser 138 at each position may be necessary for proper wire placement.

This process continues for each of the segments 115, until all of the segments 115 have been wound. Advantageously, because the segments 115 are wound in a single winding operation, it is possible to wind the segments 115 with a single continuous length of wire.

Figure 9:
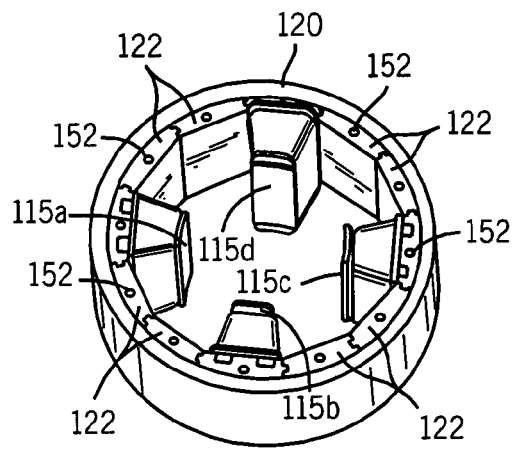
FIG. 9 is a perspective view of a plurality of segments separated by spacers and clamped within a ring clamp.
Figure 10:
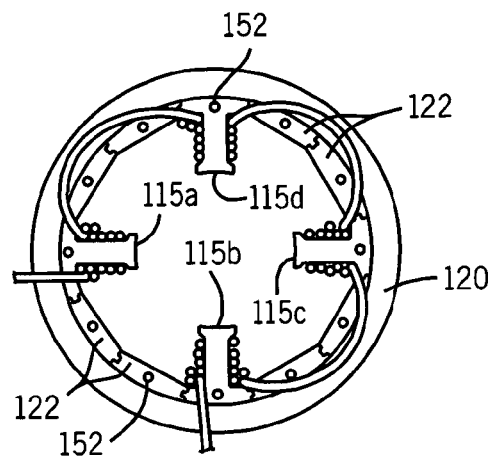
FIG. 10 is a plan view of the assembly of FIG. 9.

FIGS. 9 and 10 show the segments 115 after the winding operation discussed in connection with FIG. 8 is complete. FIG. 9 is a perspective view of the segments 115 and the ring clamp 120 including the spacers 122. In FIG. 9, the segments 115 have been removed from the winding fixture 110. Additionally, for simplicity, individual coil turns have not been shown in FIG. 9, but rather the coils are shown only schematically. FIG. 10 is top view of the arrangement shown in FIG. 9, with individual coil turns shown.

Figure 11:
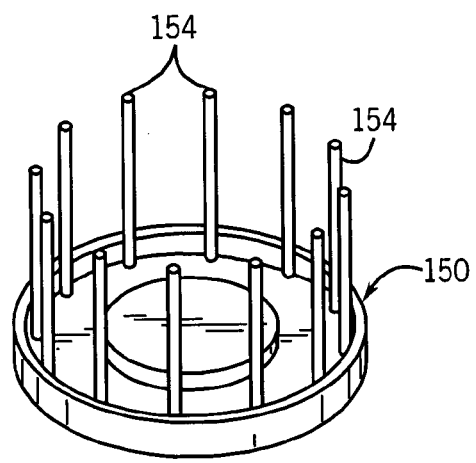
FIG. 11 is a perspective view of an assembly fixture used in connection with the assembly of FIGS. 9-10.
Figure 12:
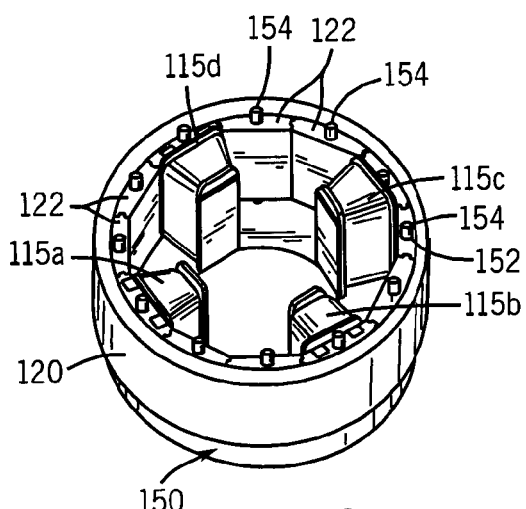
FIG. 12 is a perspective view of the clamped assembly of FIG. 9-10 mounted on the assembly fixture of FIG. 11.

FIG. 11 shows an assembly fixture 150, and FIG. 12 shows the segments 115 being mounted to the assembly fixture 150. The segments 115 each comprise holes 152 that extend vertically through the segments 115. The segments 115, while they are still mounted in the ring clamp 120, are placed onto the assembly fixture 120, which comprises a plurality of guide pins 154 that extend through the holes 152. The holes 152 and the pins 154 therefore cooperate to hold the segments in place within the assembly fixture 150. Consequently, the ring clamp 120 including the spacers 122 may be removed, with the segments 115 being retained on the assembly fixture 120, as shown in FIG. 13.

For a three phase motor, the process that has been described with respect to FIG. 8 is performed two additional times for a total of three times, one time for each phase of the motor. In FIG. 13, the first set of segments 115 is combined with a second set of segments 116 such that the segments 115 and the segments 116 are disposed in a common circular arrangement, with the segments 116 fitting within the spaces between the segments 115 and vice versa. FIG. 13 shows the second set of segments 116 in cutaway fashion, such that the fourth segment of the second set of segments 116 is not shown.

FIG. 14 shows the first set of segments 115 combined in a common circular arrangement with the second set of segments 116 and a third set of segments 117 to form a completed three phase stator. In FIG. 14, the rotatable clamp 120 and the assembly fixture 150 have both been removed, and the segments 115-117 are in the configuration needed for assembly into a motor housing.

From the foregoing description, a number of advantages of a winding fixture according to a second embodiment of the invention are apparent. First, the winding fixture 110 is constructed and arranged so as to permit segments to be wound with as a set with a single continuous length of wire. As a result, when the various sets of stator segments are combined, the number of manual interconnections that must be made is minimized.

Additionally, the winding fixture 110 achieves this advantage while making maximum use of existing bobbin winding technologies. The bobbin winder 132 may be similar to bobbin winders that have previously been used for winding unsegmented stators. As a result, the winding fixture 110 can be implemented in straightforward fashion by making maximum use of existing technologies.

Although two preferred embodiments of the invention have been described, it will be apparent to those skilled in the art that other embodiments are also possible. Many other changes and modifications may be made to the present invention without departing from the spirit thereof. The scope of these and other changes will become apparent from the appended claims.

The invention claimed is:

1. An electromechanical device, comprising:
   N sets of stator segments, each segment comprising a respective, separate bobbin, wherein each separate bobbin comprises first and second mounting ends positioned opposite from one another along a winding axis, the first and second mounting ends are configured to align the winding axes of the segments with one another for winding about a common axis of rotation, and the N sets of segments are wound with a single continuous length of wire for each set such that the segments of each set are electrically in series,
   wherein the N sets of segments are combined in a circular arrangement, wherein the single continuous length of wire of each segment is maintained on the bobbin on which the wire was wound; and
   wherein the segments are configured to clamp together in a side-by-side orientation along the common axis of rotation.

2. The electromechanical device of claim 1, wherein N is the number of phases of the electromechanical device.

3. The electromechanical device of claim 2, wherein each set of the N sets includes M stator segments, and M is the number of poles of the electromechanical device.

4. The electromechanical device of claim 1, wherein the segments are configured to clamp together between end nesting pieces.

5. The electromechanical device of claim 4, wherein the segments are configured to clamp together via compressive forces applied to the end nesting pieces.

6. The electromechanical device of claim 1, wherein the first mounting end comprises a first curved surface and the second mounting end comprises a second curved surface opposite from the first curved surface, and the first and second curved surfaces have curvatures in a common direction.

7. The electromechanical device of claim 1, wherein the first mounting end comprises a tongue and groove joint.

8. The electromechanical device of claim 1, wherein the circular arrangement is disposed on an inner circumference of the electromechanical device.

9. The electromechanical device of claim 1, wherein the circular arrangement is disposed on an outer circumference of the electromechanical device.

10. An electromechanical device, comprising:
 a plurality of radial segments, each radial segment of the plurality of radial segments comprising a respective, separate bobbin, wherein each separate bobbin comprises first and second mounting ends, and the first mounting end comprises a sliding mount having a sliding direction oriented transverse to a winding axis of the respective separate bobbin; and
 a single wire that is wound about the winding axis of the separate bobbin of each of the plurality of radial segments one after another without interruption or joinder of the single wire therebetween.

11. The electromechanical device of claim 10, wherein N sets of M segments are combined into a circular arrangement, wherein N is the number of phases and M is the number of poles of the electromechanical device.

12. The electromechanical device of claim 10, wherein the sliding mount comprises a mounting bore oriented transverse to the winding axis.

13. The electromechanical device of claim 10, wherein the plurality of radial segments are combined into a circular arrangement disposed on an inner circumference of the electromechanical device.

14. The electromechanical device of claim 10, wherein the plurality of radial segments are combined into a circular arrangement disposed on an outer circumference of the electromechanical device.

15. An electromechanical device, comprising:
 N sets of segments, each segment of the N sets of segments comprising a respective, separate bobbin, wherein each separate bobbin comprises opposite first and second mounting ends configured to mount the segments side by side with one another for winding about a common axis of rotation, and the first mounting end comprising a mounting guide having a path generally perpendicular to the common axis;
 wherein a single uninterrupted wire is sequentially wound about all of the segments in each set of the N sets of segments, wherein the N sets of segments are combined in a circular arrangement.

16. The electromechanical device of claim 15, wherein each set of the N sets of segments is wound separately from remaining ones of the sets of segments and then combined in the circular arrangement with the remaining ones of the sets of segments.

17. The electromechanical device of claim 15, wherein the first mounting end comprises a tongue and groove joint and/or a guide bore, wherein the tongue and groove joint and/or guide bore are oriented transverse to the common axis.

18. The electromechanical device of claim 15, wherein each set includes four segments.

19. The electromechanical device of claim 15, wherein N is three.

20. An electromechanical device, comprising:
 N sets of stator segments, each segment comprising a respective, separate bobbin, wherein each separate bobbin comprises first and second mounting ends positioned opposite from one another along a winding axis, the first and second mounting ends are configured to align the winding axes of the segments with one another for winding about a common axis of rotation, and the N sets of segments are wound with a single continuous length of wire for each set such that the segments of each set are electrically in series,
 wherein the N sets of segments are combined in a circular arrangement; wherein the single continuous length of wire of each segment is maintained on the bobbin on which the wire was wound; and
 wherein the first mounting end comprises a first curved surface and the second mounting end comprises a second curved surface opposite from the first curved surface, and the first and second curved surfaces have curvatures in a common direction.

21. An electromechanical device, comprising:
 N sets of stator segments, each segment comprising a respective, separate bobbin, wherein each separate bobbin comprises first and second mounting ends positioned opposite from one another along a winding axis, the first and second mounting ends are configured to align the winding axes of the segments with one another for winding about a common axis of rotation, and the N sets of segments are wound with a single continuous length of wire for each set such that the segments of each set are electrically in series,
 wherein the N sets of segments are combined in a circular arrangement; wherein the single continuous length of wire of each segment is maintained on the bobbin on which the wire was wound; and wherein the first mounting end comprises a tongue and groove joint.

* * * * *